United States Patent
Fukui (10) Patent No.: US 7,430,369 B2
(45) Date of Patent: Sep. 30, 2008

(54) IMAGE CAPTURE APPARATUS AND CONTROL METHOD THEREFOR

(75) Inventor: Takaaki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 11/202,489

(22) Filed: Aug. 12, 2005

(65) Prior Publication Data

US 2006/0034602 A1   Feb. 16, 2006

(30) Foreign Application Priority Data

Aug. 16, 2004  (JP)  ............... 2004-236501

(51) Int. Cl.
  G03B 17/00  (2006.01)
  G03B 3/00   (2006.01)
  G03B 13/00  (2006.01)
  G03B 9/02   (2006.01)
  H04N 5/222  (2006.01)

(52) U.S. Cl. .................. 396/78; 396/128; 396/263; 396/509; 348/333.04; 382/118

(58) Field of Classification Search .......... 396/59, 396/263, 502, 509, 1, 2, 78, 128; 348/333.12 348/222.1, 333.04; 382/118
See application file for complete search history.

(56) References Cited

U.S. PATENT DOCUMENTS

| | | | |
|---|---|---|---|
| 6,301,440 B1 | 10/2001 | Bolle et al. | .............. 396/128 |
| 6,483,993 B1 | 11/2002 | Misumi et al. | .............. 396/78 |
| 6,636,694 B1 | 10/2003 | Misumi et al. | .............. 396/1 |
| 6,813,439 B2 | 11/2004 | Misumi et al. | .............. 396/2 |
| 6,829,432 B2 | 12/2004 | Misumi et al. | .............. 396/1 |
| 7,362,354 B2* | 4/2008 | Lin | .............. 348/222.1 |
| 2003/0151674 A1 | 8/2003 | Lin | .............. 348/222.1 |
| 2003/0202685 A1* | 10/2003 | Shimizu et al. | ............. 382/118 |
| 2004/0061796 A1 | 4/2004 | Honda et al. | .............. 348/297 |
| 2004/0207743 A1* | 10/2004 | Nozaki et al. | .......... 348/333.12 |

FOREIGN PATENT DOCUMENTS

| | | |
|---|---|---|
| EP | 1085366 A | 3/2001 |
| EP | 1128316 A | 8/2001 |
| EP | 1404111 A | 3/2004 |
| EP | 1441497 A | 7/2004 |
| JP | H03-144427 | 6/1991 |
| JP | 2000-292853 A | 10/2000 |
| JP | 2002-251380 A | 9/2002 |

* cited by examiner

Primary Examiner—Melissa Jan Koval
(74) Attorney, Agent, or Firm—Canon U.S.A. Inc., I.P. Division (57) ABSTRACT

An image capture apparatus, such as a digital camera or a digital still camera, is capable of easily capturing an optimal image by determining a state of a subject via image processing during capturing, and executing re-capturing or giving a warning to prompt re-capturing according to a result of the determination.

16 Claims, 11 Drawing Sheets

ORIGINAL IMAGE

FIG.3B

FLESH COLOR AREA
EXTRACTION IMAGE

FIG.3C

HIGH-PASS FILTER
ADAPTATION IMAGE

IMAGE CAPTURE APPARATUS AND CONTROL METHOD THEREFOR

BACKGROUND OF THE INVENTION

1. Field of the Invention

The present invention relates to a control method facilitating capturing an optimal image in an image capture apparatus, such as a digital camera or a digital video camera.

2. Description of the Related Art

As a function of checking a captured image in an image capture mode, an image capture apparatus, such as a digital camera or a digital video camera, has a REC review function of displaying a photographed image on a liquid crystal display (LCD) immediately after capturing the image.

In a reproduction mode (playback mode), the image capture apparatus has a function of sequentially displaying photographed images according to a user's operation. In the image capture apparatus (the digital camera or the digital video camera), when such functions are used, since a screen size is small in an electronic viewfinder (EVF) which is used for checking captured images, the captured images are reduced to be displayed in many cases.

Thus, even when capturing cannot be performed as intended by a user, e.g., the eyes of a human subject are closed, the subject is in a red-eye state, a luminance degree of a subject's face is too high, or the subject is out of focus, it is difficult for the user to check for such a situation if the displayed subject image is small.

Accordingly, such an image capture apparatus has a function of enabling the user to check a captured image by magnifying the image according to a user's button operation.

However, magnifying a captured image at each time of capturing takes time and is cumbersome. Thus, the composition of a subject (a photographic subject) may change during a user's operation even if the user intends to perform capturing again because of incomplete captured images.

Rather than checking an image at each time of capturing, some users may check captured images collectively after completion of capturing a plurality of images.

In this case, only after a while from capturing of the first image, the user can find that the captured image is not an intended one. In this case, the composition of a subject may, also, change during a user's operation even if the user intends to perform capturing again because of incomplete captured images.

Japanese Patent Application Laid-Open No. 2000-292853 discloses a technology of always outputting best images by detecting positions of a face and eyes of a subject and automatically eliminating images inappropriate as output photographs, e.g., closed eye images.

The above technology is based on the premise that the positions of the eyes of a subject are detected, a state of the eyes is determined, and capturing is performed only when the pupils are open.

Thus, the above technology is effective in the case of performing capturing on the premise that one human subject is a capturing target as in a certification photograph and the eyes of the subject are open.

However, in a general method of using a digital camera or a digital video camera in which a user performs capturing at an optional timing, a state of closed eyes may be captured, and a method of uniquely deciding processing according to a state of a subject is not preferable.

SUMMARY OF THE INVENTION

The present invention has been made in consideration of the above situation, and is directed to an image capture apparatus capable of easily capturing an optimal image by determining a state of a subject by image processing and issuing a warning to prompt re-capturing according to a result of the determination.

In one aspect of the present invention, an image capture apparatus includes an image capture unit configured to capture image data according to an instruction from a user, a subject detection unit configured to detect a subject area from the captured image data, a signal processing unit configured to generate display image data based on the captured image data, a display unit configured to display the display image data generated by the signal processing unit, a determination unit configured to determine whether to issue a warning based on a result of the detection by the subject detection unit, an informing unit configured to issue a warning according to a result of the determination by the determination unit if the determination unit determines that a warning should be issued, and a control unit configured to, according to contents of the warning, change a control parameter of the image capture unit and to cause the image capture unit to capture image data if the determination unit determines that a warning should be issued.

In another aspect of the present invention, a control method for an image capture apparatus includes a subject detection step of detecting a subject area from image data captured according to an instruction from a user, a signal processing step of generating display image data based on the image data captured according to the instruction from the user, a display step of displaying the display image data generated by the signal processing step, a determination step of determining whether to issue a warning based on a result of the detection by the subject detection step, an informing step of issuing a warning if determination by the determination step determines that a warning should be issued, and a control step of, according to contents of the warning, changing a control parameter of an image capture unit and causing the image capture unit to re-capture image data if the determination unit determines that a warning should be issued.

In another aspect of the present invention, a program causes a computer to perform the control method.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention will be described in detail in accordance with the accompanying drawings.

First Embodiment

Figure 1:
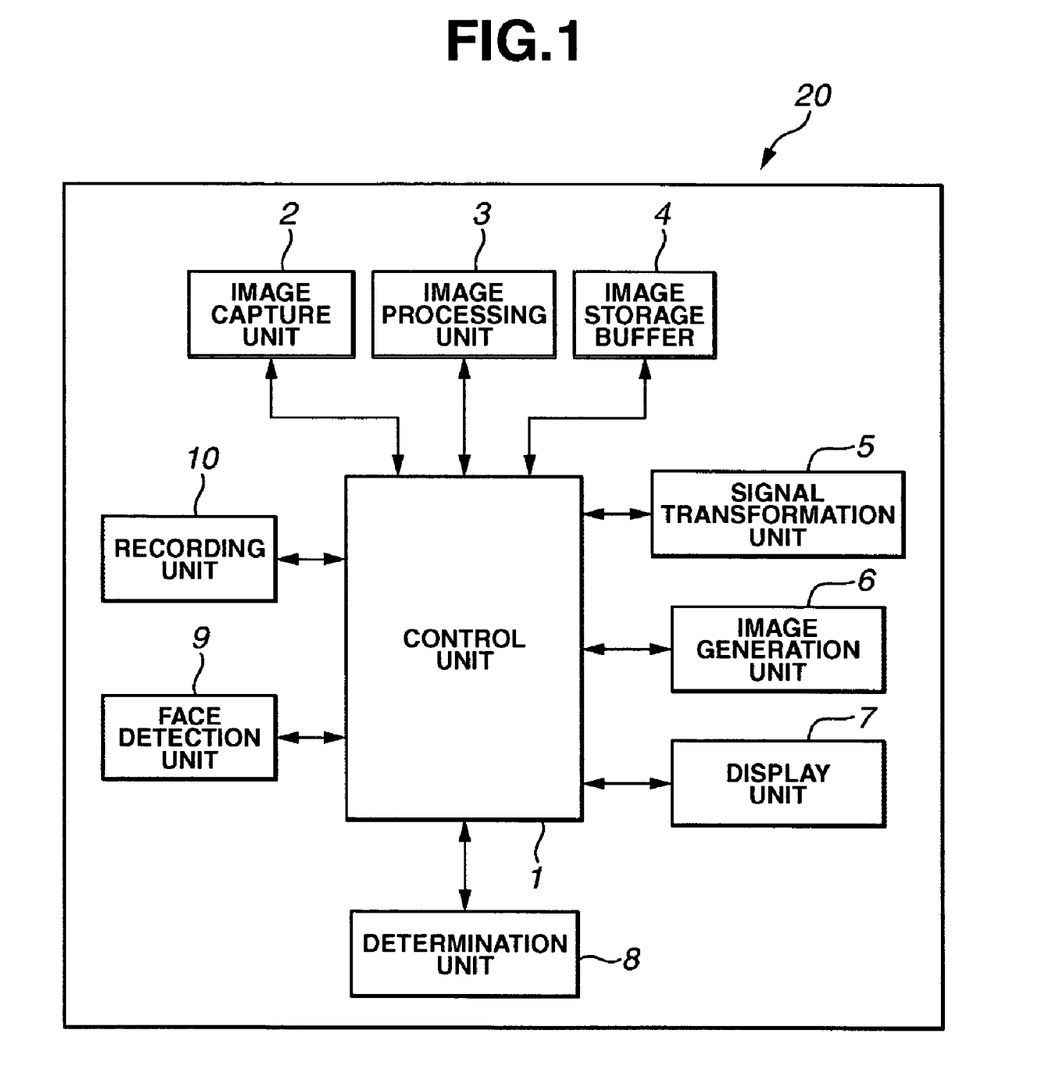
FIG. 1 is a block diagram showing an image capture apparatus according to a first embodiment of the present invention.

FIG. 1 shows a configuration of an image capture apparatus 20 according to a first embodiment of the present invention. Description will be made by taking an example of a digital camera as the image capture apparatus 20.

Referring to FIG. 1, a control unit 1 controls a signal for controlling each function of the image capture apparatus 20.

An image capture unit 2 includes a solid-state image sensor such as a charge-coupled device (CCD) or a complementary metal-oxide semiconductor (CMOS) having a photoelectric conversion function, an imaging optical system for guiding subject light to the solid-state image sensor, a light amount adjustment member constituted of a diaphragm or a shutter for adjusting an amount of light reaching the solid-state image sensor, an auto-gain controller (AGC) for adjusting a gain of an output signal of the solid-state image sensor, and the like.

An image processing unit 3 receives a signal output from the image capture unit 2 and generates image data by executing signal processing, e.g., well-known color correction processing, luminance correction processing, and the like.

An image storage buffer 4 stores the image data generated by the image processing unit 3.

A signal transformation unit 5 reads the image data stored in the image storage buffer 4 and transforms the data into image data having a data amount thinned.

A face detection unit 9 detects a human face in the image data by using the image data stored in the image storage buffer 4.

A determination unit 8 determines whether the human face detected by the face detection unit 9 satisfies predetermined conditions.

An image generation unit 6 combines the image data generated by the signal transformation unit 5 with a displayed warning.

A display unit 7 converts an output of the image generation unit 6 into an analog signal by a digital-to-analog (D/A) converter (not shown) and displays an image represented by the analog signal.

A recording unit 10, such as a flash memory, stores the image data temporarily stored in the image storage buffer 4.

Figure 2:
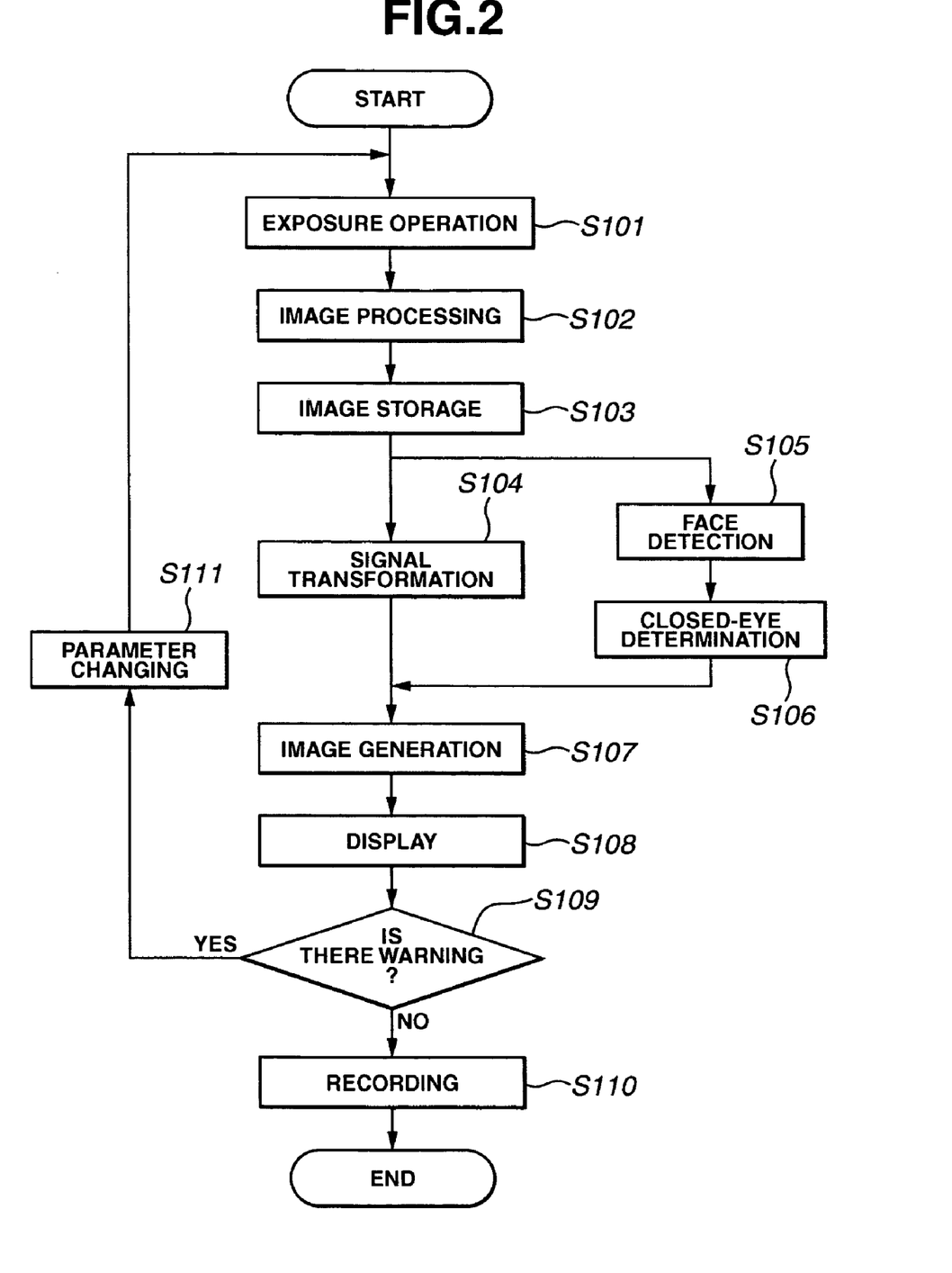
FIG. 2 is a flowchart showing processing according to the first embodiment.

FIG. 2 is a flowchart illustrating a flow of processing according to the first embodiment. It is to be noted that this flowchart shows a process performed after a release switch (not shown) of the camera is operated by a user so as to cause the control unit 1 to generate an instruction for recording captured image data.

In step S101, the image capture unit 2 performs an exposure operation for the solid-state image sensor according to a set exposure value, and adjusts a gain of an output signal of the solid-state image sensor.

In step S102, the image processing unit 3 generates image data by processing a signal output from the image capture unit 2.

In step S103, the control unit 1 stores the image data generated in the step S102 in the image storage buffer 4. Processing of the next step S104 and those of steps S105 and S106 are executed in parallel for the image data stored in the image storage buffer 4.

In step S104, the signal transformation unit 5 generates display image data of a resolution smaller than that of the image data stored in the image storage buffer 4.

The reason for transformation into the display image data of a smaller resolution is that the system has a limit on resolutions to be displayed because of the performance of an EVF, processing of image data of a high resolution causes an increase in processing time, and, thus, an amount of data to be processed is reduced to achieve a high processing speed by transformation into an image of a small resolution having data thinned.

In step S105, the face detection unit 9 detects a face (described below) in the image data stored in the image storage buffer 4 in the step S103.

In step S106, the determination unit 8 determines whether the eyes of the face detected by the face detection unit 9 are closed. According to the first embodiment, when the eyes of the subject are determined to be closed, a warning is issued. Now, the reason for separate executions of the processing of the step S104 and those of the steps S105 and S106 will be described. The resolution of the display image data generated in the step S104 is small. Accordingly, when the determination unit 8 makes determination using the display image data, the determination may fail especially in the case of a small subject. Thus, in the steps S105 and S106, a determination is made as to whether the eyes are closed by using image data of a resolution larger than that of the display image data, so that the accuracy of the determination can be higher as compared with the case of using the display image data. It is to be noted that determination image data of a resolution larger than that of the display image data generated in the step S104 but smaller than that of the image data stored in the image storage buffer 4 may be generated to increase a determination speed, and, then, face detection and closed-eye determination may be carried out based on the determination image data.

In step S107, if warning is determined to be necessary in step S106, the image generation unit 6 combines the image data generated in step S104 with a displayed warning to generate and output new image data. If warning is determined to be unnecessary in step S106, the image generation unit 6 directly outputs the image data generated in step S104.

In step S108, the display unit 7 receives image data output from the image generation unit 106 and displays an image represented by the image data.

In step S109, a determination is made as to whether the closed eyes of the subject have been determined in step S106. If the closed eyes of the subject have not been determined, the process proceeds to step S110, where the image data stored in the image storage buffer 4 is recorded on the recording unit 10 such as a flash memory, thus finishing the processing.

If, in step S109, it is determined that the closed eyes of the subject have been determined, the process proceeds to step S111. In step S111, the control unit 1 holds control parameters of the image capture unit 2, such as an amount of flash light, a capturing sensitivity, a shutter speed, and the like, and returns to step S101 to drive the image capture unit 2 again so as to perform an exposure operation for the solid-state image sensor. Alternatively, in step S111, the control unit 1 performs a focus adjustment operation and a light metering operation again to set new control parameters of the image capture unit 2 (such as an amount of flash light, a capturing sensitivity, a shutter speed, and the like), and then returns to step S101 to drive the image capture unit 2 again so as to perform an exposure operation for the solid-state image sensor.

The control parameters are changed in step S111 because of a possibility that a capturing scene may be changed from the first capturing due to a change with time.

Then, if the control parameters of the image capture unit 2 are changed in step S111, the control unit 1 sets the changed control parameters and returns to step S101 to drive the image capture unit 2 again so as to perform an exposure operation for the solid-state image sensor.

Next, face detection processing carried out by the face detection unit 9 will be described.

As typical face detection methods, there have heretofore been many proposals, such as a method of using learning typified by neural network, a method of finding a portion having a characteristic shape such as an eye, a nose or a mouth from an image area by using template matching, and determining the portion to be a face if shape similarity is high, a method of detecting an amount of characteristics of an image, such as a flesh color or an eye shape, and using statistical analysis, and the like. Generally, a plurality of such methods are combined to carry out face detection.

Specifically, Japanese Patent Application Laid-Open No. 2002-251380 discloses a method of carrying out face detection by using wavelet transformation and an amount of characteristics of an image.

Now, a method of carrying out face detection by executing template matching based on color information and a characteristic eye shape will be described.

Figure 3A:
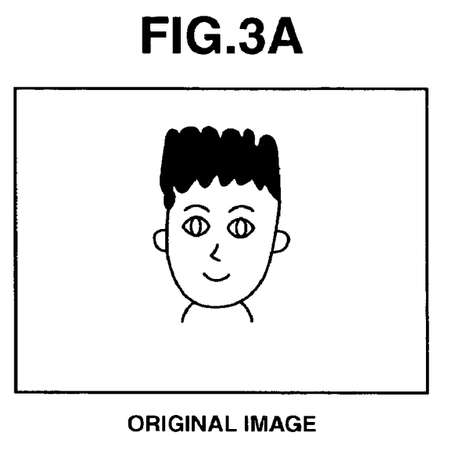
FIGS. 3A to 3C are diagrams illustrating a face detection method according to the first embodiment.
Figure 3B:
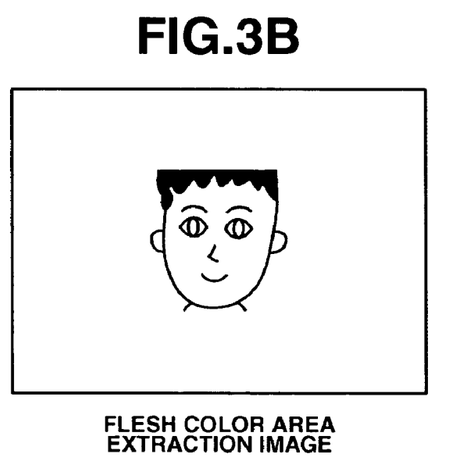
Figure 3C:
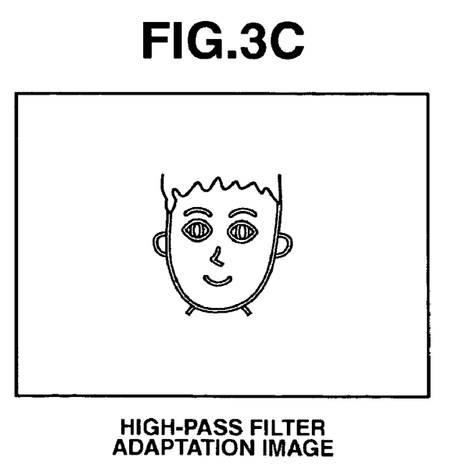
Figure 4:
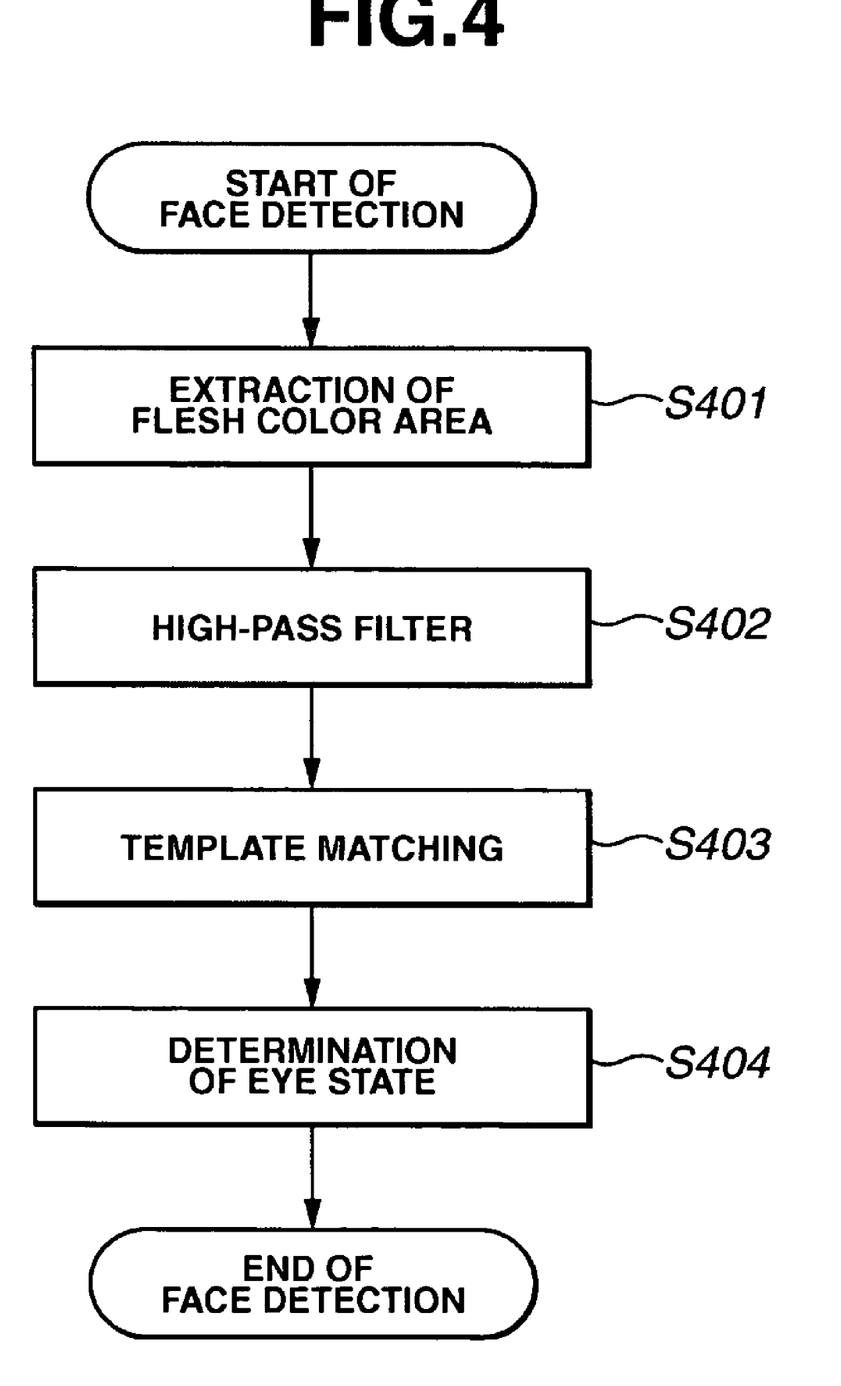
FIG. 4 is a flowchart showing exemplary processing of the face detection method of the first embodiment.

FIGS. 3A to 3C show examples of a face detection method and an eye state determination method according to the first embodiment. FIG. 4 is a flowchart illustrating the face detection method of the first embodiment.

In step S401, the face detection unit 9 extracts a flesh color area from target image data.

Figure 5:
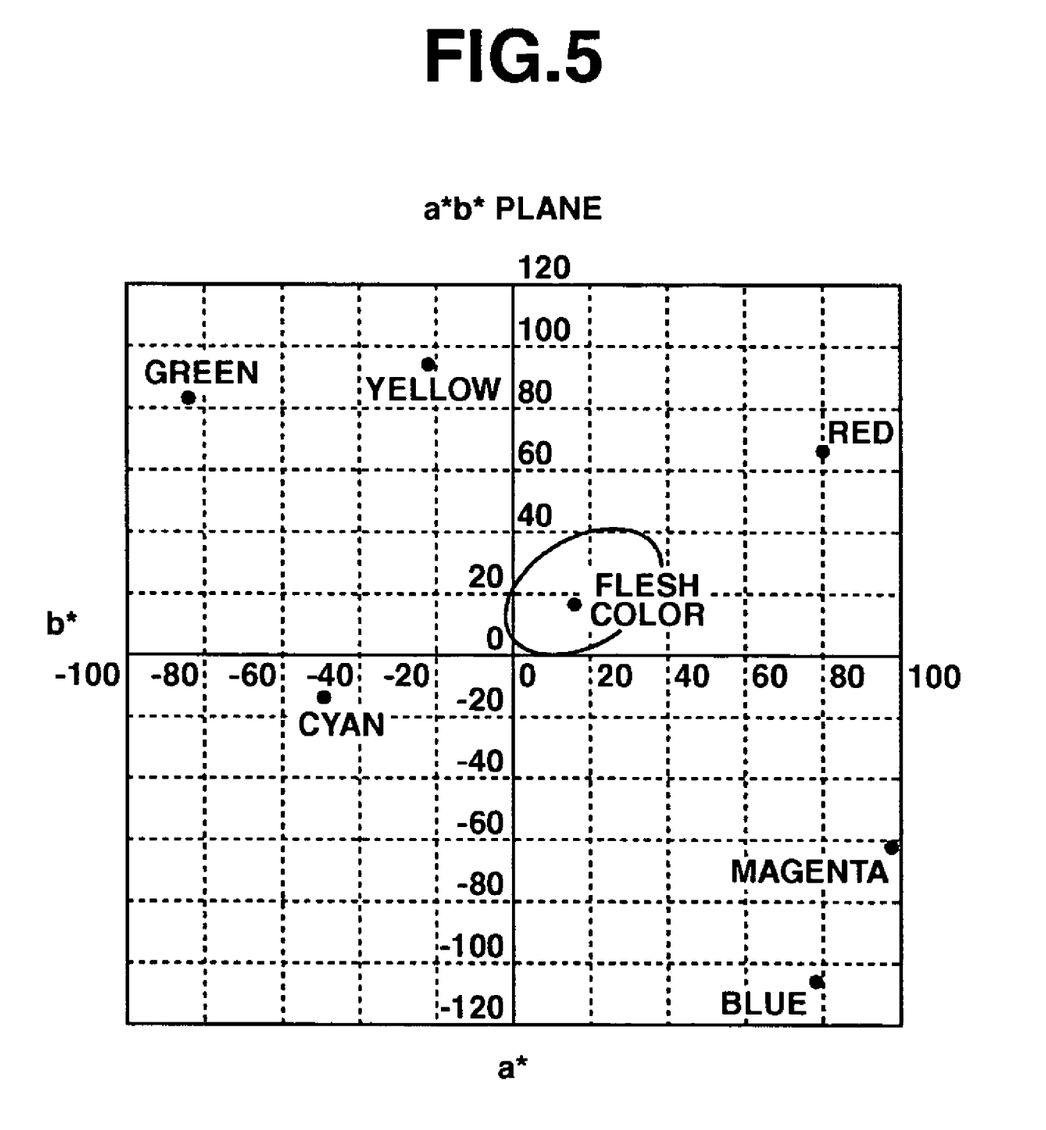
FIG. 5 is a diagram showing a representative chromaticity in a CIELab color space.

FIG. 5 is a chromaticity diagram indicating typical colors in a color space of CIELab. An elliptic area shown in FIG. 5 is an area having a high possibility of a flesh color.

FIG. 3A shows image data targeted for face detection.

FIG. 3B shows a chromaticity area corresponding to a flesh color area extracted from the image shown in FIG. 3A.

In step S402, for example, the face detection unit 9 applies a high-pass filter to the image targeted for face detection.

FIG. 3C shows an example of an image obtained by applying the high-pass filter to the image shown in FIG. 3B.

According to the first embodiment, the face detection unit 9 detects characteristic portions, such as an eye, a nose, a mouth and a brow, in the extracted flesh color area, and eliminates portions other than the face from the flesh color area.

Figure 6:
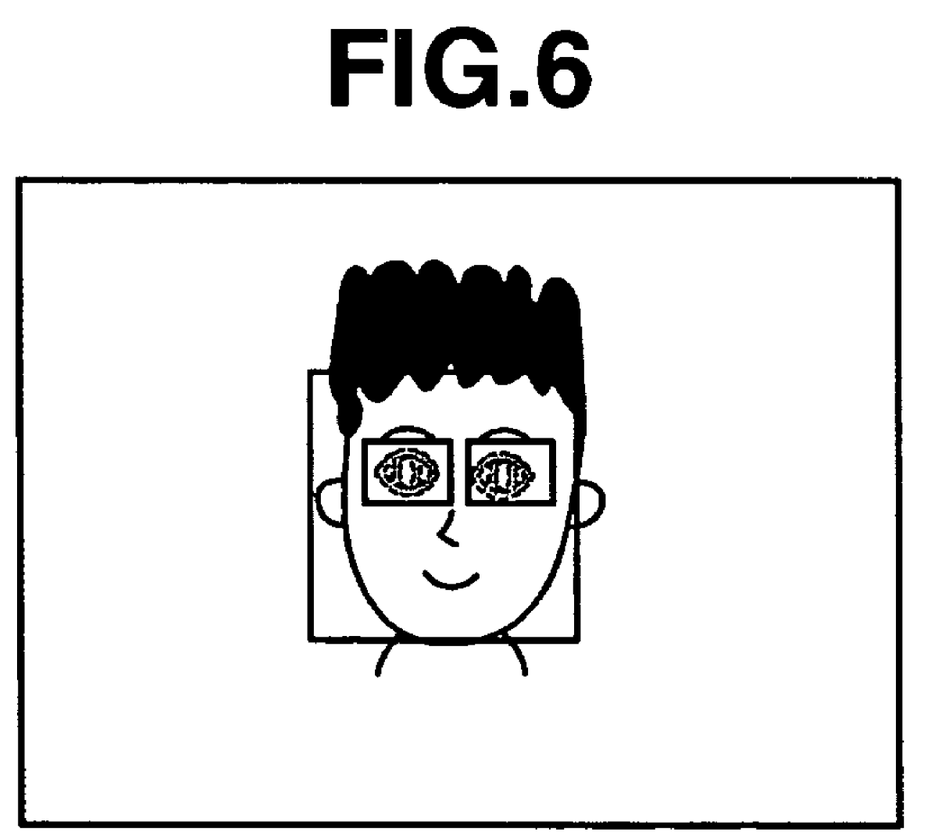
FIG. 6 is a diagram showing template matching according to the first embodiment.

In step S403, as shown in FIG. 6, for the area detected in the step S402, template matching is executed by using template data of eyes prerecorded in the memory of the image capture apparatus (coincidence or similarity is verified by comparing the template data with captured image data), and eyes are detected in the captured image data.

In step S404, the face detection unit 9 compares the image data of eyes detected in the step S403 with the image data of eyes detected by the template matching. If a result of the comparison shows that eye opening is not enough, only one eye is detected, or neither of eyes are detected, closed eyes of the subject are determined, and the flow is finished.

Figure 7:
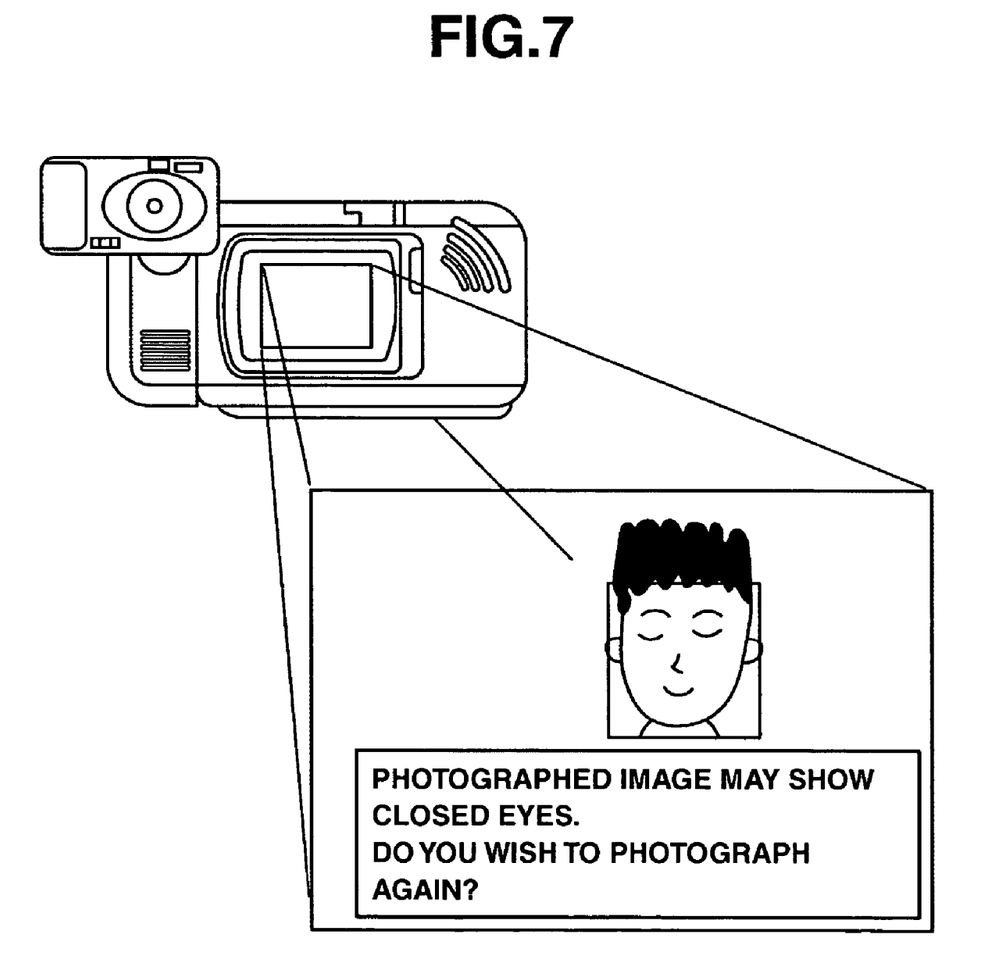
FIG. 7 is a diagram showing a form of warning according to the first embodiment.

FIG. 7 shows a situation of displaying the closed eyes of the subject on a screen to give a warning.

When the subject closes the eyes, the image generation unit 6 displays characters or an icon in combination with the captured image on the screen, so that a warning can be given to the user in an easily understood manner.

The method of warning is not limited to the above. The above method can be replaced by a voice method, a method of flashing or lighting an LED, or the like.

The user can know re-execution of capturing on the spot upon issuance of a warning.

In the flowchart of FIG. 2, capturing is executed again automatically if the eyes of the subject are closed. However, the invention is not limited to this configuration.

Intentional capturing of a scene which the determination unit 8 may determine inappropriate, such as a winking scene of the subject, is imaginable. Thus, determination as to whether to re-execute capturing after the issuance of a warning may be left to the user.

A configuration may be employed in which switching may be made between automatic re-execution of capturing and user's selection by pressing a selection button (not shown).

If the user determines a necessity of re-capturing when a warning is issued, the user can decide whether to immediately execute capturing again in consideration of a composition of an image displayed on the EVF.

It may be difficult to determine whether the eyes of the subject are closed because of a low resolution of the image displayed on the EVF. However, the user can be made aware of closed eyes of the subject quickly depending on the presence of a warning, and capturing can be carried out again before the composition of the subject is greatly changed.

Thus, the user can freely select re-execution of capturing by comparing the composition of the subject image with an eye state of the subject.

According to the first embodiment, the parameters are changed when re-capturing is executed as a result of warning. However, time from last capturing having obtained image data which is a basis for warning determination may be measured and, if a passage of predetermined time is determined, a light metering operation and a focus adjustment operation may be performed again to set new control parameters of the image capture unit 2.

Next, a modified example of the first embodiment will be described.

According to this modified example, face detection is executed before a release switch (not shown) of the camera is operated by a user. An example of an image capture mode in which the user can monitor a subject on the display unit 7 from a point of time before the release switch is operated by the user will be described with reference to the exemplary flowchart shown in FIG. 8.

Figure 8:
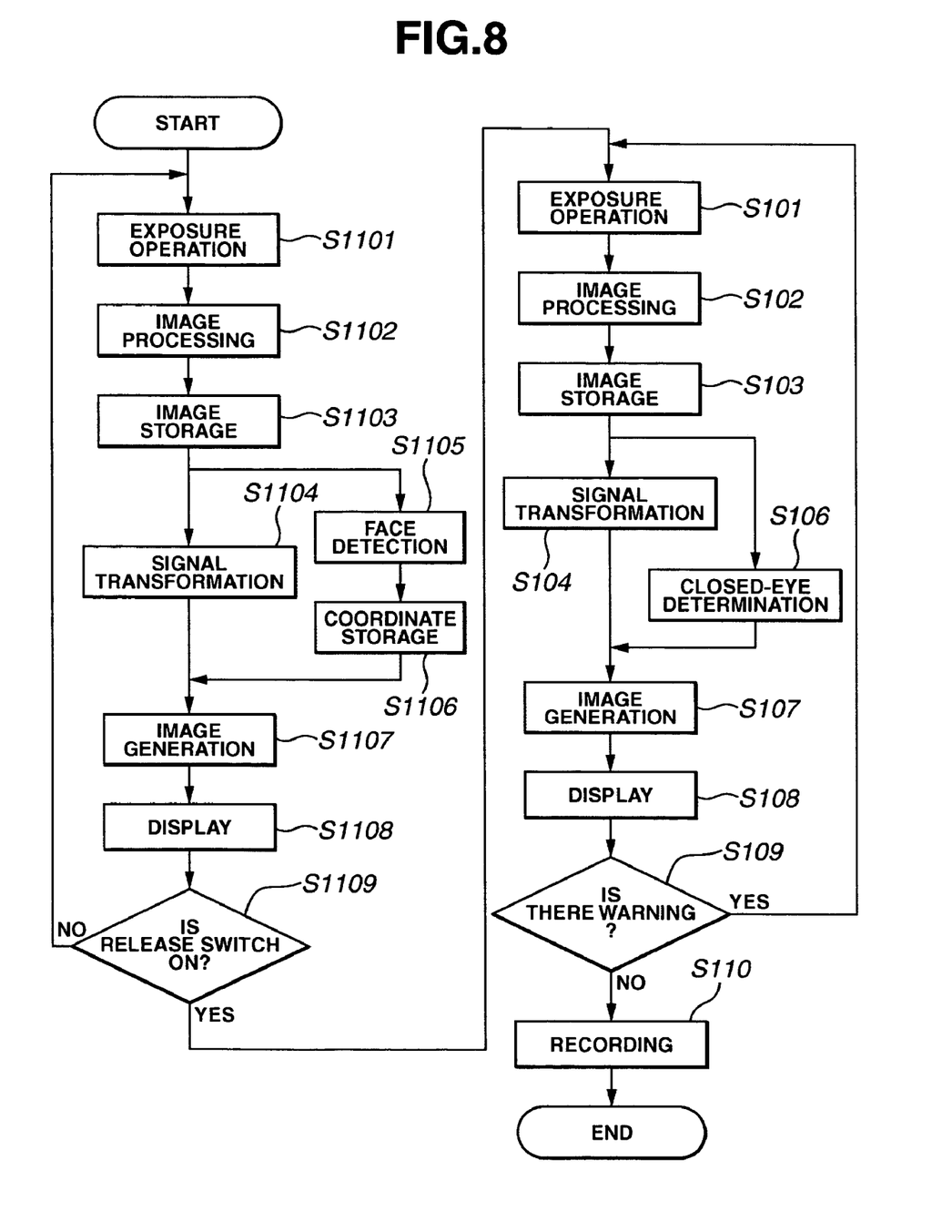
FIG. 8 is a flowchart showing exemplary processing according to a modified example of the first embodiment.

When a mode of capturing a still image is set on the camera, in step S1101, in order to enable the user to obtain image data for monitoring a subject, the image capture unit 2 executes an exposure operation for the solid-state image sensor, and adjusts a gain of an output signal of the solid-state image sensor.

In step S1102, the image processing unit 3 processes a signal output from the image capture unit 2 to generate image data.

In step S1103, the control unit 1 stores the image data generated in the step S1102 in the image storage buffer 4.

In step S1104, the signal transformation unit 5 generates display image data of a resolution smaller than that of the image data stored in the image storage buffer 4.

In step S1105, the face detection unit 9 executes face detection from the image data stored in the image storage buffer 4 in the step S1103. This processing is similar to that of the step S105 shown in FIG. 2.

In step S1106, coordinates of an area in which the detected face is present are stored.

In step S1107, a frame is generated according to the coordinates stored in the step S1106, and this frame is combined with the image data generated in the step S1104 to generate new image data.

In step S1108, the display unit 7 executes displaying using the new image data. Accordingly, the user can recognize an area which the camera detects as a face, and an area for which focus adjustment and exposure control are preferentially executed. The camera performs focus adjustment and exposure control with weighting placed on image data of the area in which a face is present, and sets exposure time.

In step S1109, a determination is made as to whether a release switch (not shown) of the camera has been operated by the user. If not operated, the process returns to the step S1101. If operated, the process proceeds to step S101.

In step S101, the image capture unit 2 executes an exposure operation for the solid-state image sensor, and adjusts a gain of an output signal of the solid-state image sensor.

In step S102, the image processing unit 3 processes a signal output from the image capture unit 2 to generate image data.

In step S103, the control unit 1 stores the image data generated in step S102 in the image storage buffer 4. For the image data stored in the image storage buffer 4, processing of the next step S104 and processing of step S106 are executed in parallel.

In step S104, the signal transformation unit 5 generates display image data of a resolution smaller than that of the image data stored in the image storage buffer 4.

In step S106, the determination unit 8 determines whether there are a pair of eyes in an area corresponding to the coordinates stored in step S1106 from the image data stored in the image storage buffer 4. The determination unit 8 determines a closed-eye state of the subject if a pair of eyes are not present, and issues a warning.

In step S107, if warning is determined to be necessary in step S106, the image generation unit 6 combines the image data generated in the step S104 with a displayed warning to generate and output new image data. If warning is determined to be unnecessary in the step S106, the image generation unit 6 directly outputs the image data generated in step S104.

In step S108, the display unit 7 receives image data output from the image generation unit 106 and displays an image represented by the image data.

In step S109, a determination is made as to whether closed eyes of the subject have been determined in step S106. If the closed eyes of the subject have not been determined, the process proceeds to step S110, where the image data stored in the image storage buffer 4 is recorded on the recording unit 10, such as a flash memory, and processing is finished.

If, in step S109, it is determined that the closed eyes of the subject have been determined, the control unit 1 holds control parameters of the image capture unit 2, such as an amount of flash light, a capturing sensitivity, a shutter speed, and the like, and returns to step S101 to drive the image capture unit 2 again so as to perform an exposure operation for the solid-state image sensor. Alternatively, the control unit 1 performs a focus adjustment operation or a light metering operation to set new control parameters of the image capture unit 2 (such as an amount of flash light, a capturing sensitivity, a shutter speed, and the like), and then returns to step S101 to drive the image capture unit 2 again so as to perform an exposure operation for the solid-state image sensor.

As described above, the position of a face may be detected in the image data obtained before an instruction to record captured image data is issued from the user and, based on coordinates of the position of the face, a determination may be made as to whether the eyes are closed from the captured image data.

Second Embodiment

Next, an image capture apparatus according to a second embodiment of the present invention will be described. The description will focus on differences from the first embodiment.

According to the second embodiment, an occurrence of a red-eye phenomenon in a subject is a criterion for execution of warning.

As is well known, the red-eye phenomenon is that in the case of capturing a person under a situation of low illuminance, light is emitted from a flash apparatus to execute capturing, and the flash light emitted from the flash apparatus is reflected on the back of each eyeball, causing eyes of the person to be photographed red.

The determination unit 8 in the second embodiment determines an occurrence of a red-eye phenomenon on a face detected by the face detection unit 9.

Figure 9:
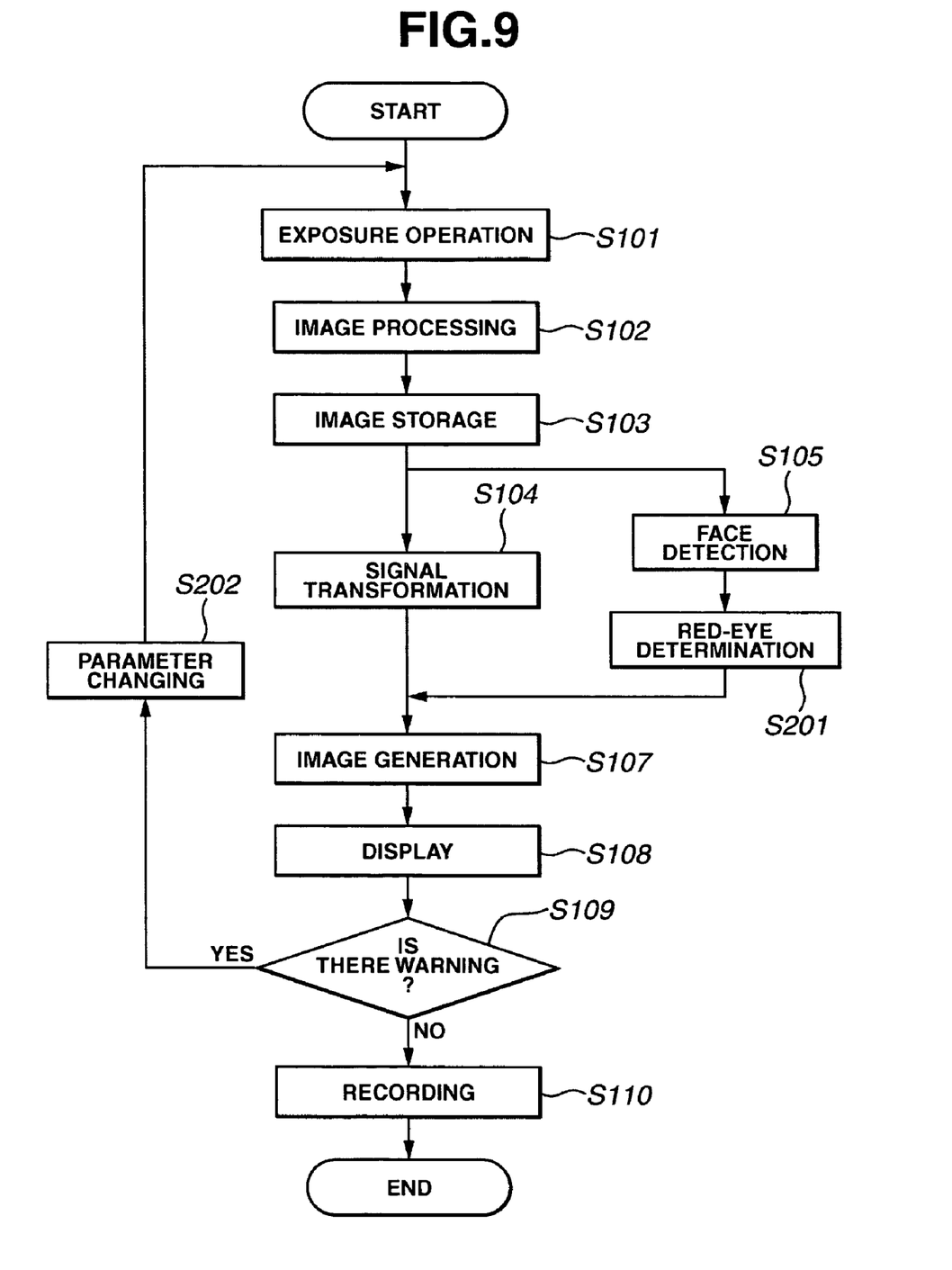
FIG. 9 is a flowchart showing exemplary processing according to a second embodiment of the present invention.

FIG. 9 is a flowchart illustrating a flow of processing according to the second embodiment.

The flow is different from that of FIG. 2 in that a red-eye phenomenon is detected from a face area detected in image data stored in the image storage buffer 4 to determine the presence of warning (steps S105, and S201), and control parameters of the image capture unit 2, such as an amount of flash light, a capturing sensitivity, a shutter speed, and the like, are forcibly changed if the execution of warning is determined (step S202).

In the red-eye phenomenon detection, first, the face detection unit 9 detects eyes from image data by processing similar to those of the steps S401 to S404 of FIG. 4. The determination unit 8 checks hues of areas detected as the eyes, detects an average hue of eye image positions, and determines an occurrence of a red-eye phenomenon if a detected red component has a value equal to or more than a threshold value.

The determination unit 8 determines whether to give a warning to a user based on a result of the red-eye phenomenon detection and capturing conditions, such as an amount of flash light emitted during capturing, surrounding brightness, a capturing sensitivity, and a shutter speed.

According to a specific determination method, if surrounding brightness of a subject to be captured is low and a large amount of flash light is emitted, the possibility of occurrence of a red-eye phenomenon becomes high, thus increasing a determination probability of a red-eye phenomenon (i.e., reducing a threshold value for a red-eye phenomenon).

Conversely, if flash light is not emitted, without adding the result of the face detection by the face detection unit 9, control is carried out to determine no warning of a red-eye phenomenon, so that high-speed and highly accurate determination can be made.

Figure 10:
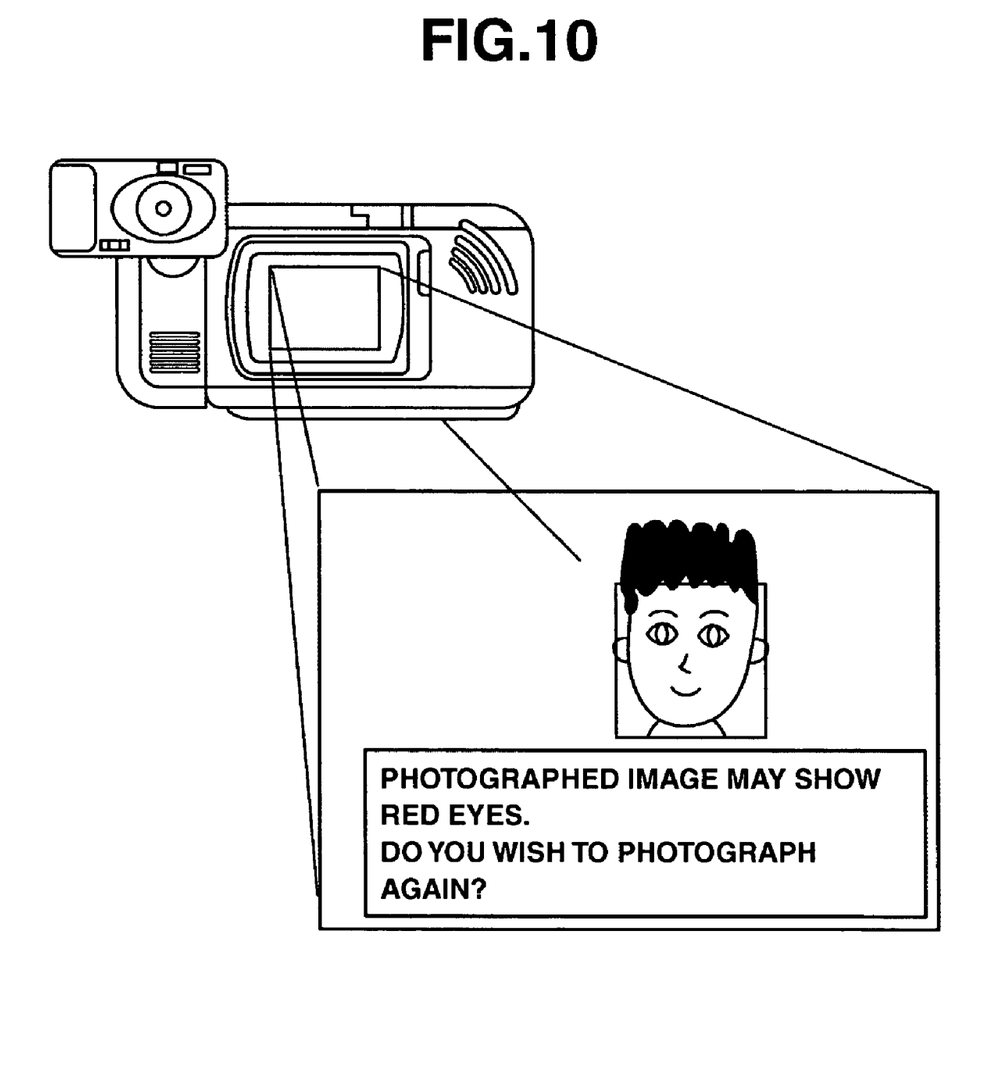
FIG. 10 is a diagram showing a form of warning according to the second embodiment.

FIG. 10 shows a situation of displaying a red-eye phenomenon on a screen to give a warning.

In the case of such a red-eye phenomenon, the image generation unit 6 displays characters or an icon in combination with the captured image on the screen, so that a warning can be given to the user in an easily understood manner.

Needless to say, a warning may be given by a voice, or by flashing or lighting an LED.

If a warning has been issued, the process proceeds to step S202, where control parameters of the image capture unit 2, such as an amount of flash light, a capturing sensitivity, a shutter speed, and the like, are changed.

Specifically, the control unit 1 changes control parameters of the image capture unit 2 by prolonging lighting time of a red-eye reduction lamp, increasing an amount of light of the red-eye reduction lamp, or changing an amount of flash light, to prevent a red-eye phenomenon from occurring. A single parameter, such as changing an amount of flash light, may be changed or a combination of parameters may be changed in order to obtain optimal results of the captured image (e.g., an amount of flash light may be changed in combination with capturing sensitivity and/or a shutter speed).

Then, after changing the control parameters of the image capture unit 2 in the step S202, the control unit 1 sets the changed control parameters and returns to the step S101, where the control unit 1 drives the image capture unit 2 again so as to perform an exposure operation for a solid-state image sensor.

Third Embodiment

An image capture apparatus according to a third embodiment of the present invention will be described. According to the second embodiment, the occurrence of a red-eye phenomenon is a criterion for warning. According to the third embodiment, however, an in-focus state or a blurring state of a face area of a subject is a criterion for warning.

The determination unit 8 in the third embodiment determines a blurring state or an in-focus state of a face detected by the face detection unit 9.

Generally, as images unsuited for capturing, there are a blurred image and an out-of-focus image. Blurring is classified into a camera shake caused by a camera being moved when a shutter button is pressed and a subject shake caused by a subject moving.

In both cases, an image area frequently moves in a fixed direction. For example, as a frequency analysis method, there is a method of detecting blurring if specific frequency components that are absent in normal images are determined to be present numerously, by using Fourier transformation or the like.

Regarding a method of detecting an out-of-focus state, there is a method of executing a frequency analysis similar to the blurring detection method and determining an out-of-focus state when the amount of high-frequency components is small.

Figure 11:
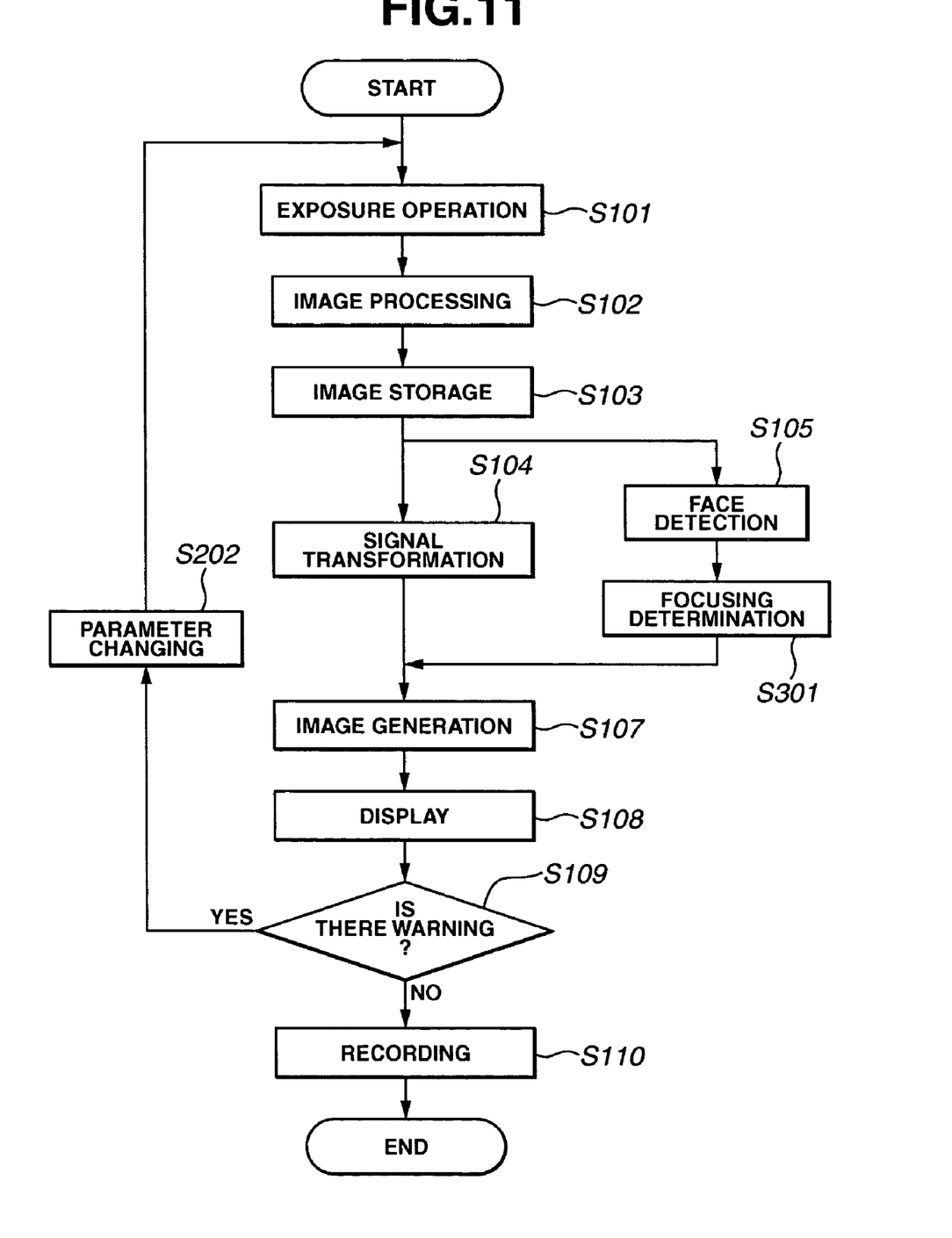
FIG. 11 is a flowchart showing exemplary processing according to a third embodiment of the present invention.

FIG. 11 is a flowchart illustrating a flow of processing according to the third embodiment.

The flow is different from that of FIG. 9 in that a face area is detected by the face detection unit 9 from image data stored in the image storage buffer 4, and an in-focus state of the detected face area is determined (steps S105 and S301).

If a warning is issued, control parameters of the image capture unit 2 are forcibly changed in a step S202.

For example, in order to prevent blurring, exposure time is shortened (shutter speed is increased), and this shortage of exposure time is compensated for by changing an aperture value and/or a sensitivity. Based on the change of the aperture value and/or the sensitivity, other parameters (e.g., a flash light parameter) may be changed in order to obtain optimal image capture results based on the changed aperture value and/or sensitivity.

According to the third embodiment, a situation of image blurring or an out-of-focus state is detected, and a user is warned about this situation, so that adequate image capturing can be performed.

The first to third embodiments have been described above by way of examples where the subject is a person, closed eyes are detected, red eyes are detected, and blurring is detected. These examples are in no way limitative of the present invention.

As long as a configuration is employed in which image processing is executed to detect characteristics of a subject from image data, and the presence of a warning is displayed or re-capturing is automatically executed according to a result of the detection, criteria other than the foregoing for incomplete image data may be used.

The present invention can be applied to various cases where a target to be a main subject is determined and a problem occurring in the target to be the main subject cannot be visually recognized by the user because a displayed captured image is small.

With the foregoing configuration, even when captured image data has a problem that a user cannot check unless the image data is displayed in a magnified manner, a warning can be given to quickly execute capturing, or re-capturing can be automatically executed, so that desired capturing can be carried out without missing a photo opportunity.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-236501 filed Aug. 16, 2004, which is hereby incorporated by reference herein in its entirety.

What is claimed is:

1. An image capture apparatus comprising:
    an image capture unit configured to capture image data;
    a subject detection unit configured to detect a subject area from the captured image data;
    a signal processing unit configured to generate display image data of a resolution smaller than that of the captured image data based on the captured image data;
    a display unit configured to display the display image data generated by the signal processing unit;
    a determination unit configured to determine whether to issue a warning based on a result of detection by the subject detection unit;
    an informing unit configured to issue a warning if the determination unit determines that a warning should be issued; and
    a control unit configured to, according to contents of the warning, change a control parameter of the image capture unit and to cause the image capture unit to capture image data if the determination unit determines that a warning should be issued.

2. The image capture apparatus according to claim 1, wherein the informing unit is configured to generate a warning contents display image having contents of the warning added to the display image data, and to cause the display unit to display the warning contents display image if the determination unit determines that a warning should be issued.

3. The image capture apparatus according to claim 1, further comprising a recording unit, wherein when the determination unit determines that warning is unnecessary, the control unit causes the recording unit to record the image data.

4. The image capture apparatus according to claim 1, wherein when detecting an instruction from the user after the warning is issued by the informing unit, the control unit causes the image capture unit to capture image data.

5. The image capture apparatus according to claim 1, wherein determination by the determination unit is performed based on an in-focus state of the subject area.

6. The image capture apparatus according to claim 1, wherein determination by the determination unit is performed based on hues of eyes of the subject.

7. The image capture apparatus according to claim 1, wherein determination by the determination unit is performed based on eye opening of the subject.

8. The image capture apparatus according to claim 1, wherein when, as a result of determination by the determination unit, causing the image capture unit to re-capture image data, the control unit sets a new control parameter of the image capture unit if a predetermined period of time or more has passed from last capturing.

9. A control method for an image capture apparatus, comprising:
- a subject detection step of detecting a subject area from image data captured;
- a signal processing step of generating display image data of a resolution smaller than that of the image data captured based on the image data captured;
- a display step of displaying the display image data generated by the signal processing step;
- a determination step of determining whether to issue a warning based on a result of detection by the subject detection step;
- an informing step of issuing a warning when the determination step determines to issue a warning; and
- a control step of, according to contents of the warning, changing a control parameter of an image capture unit and causing the image capture unit to re-capture image data when the determination step determines to issue a warning.

10. The control method for an image capture apparatus according to claim 9, wherein the informing step includes a step of generating a warning contents display image having contents of the warning added to the display image data, and displaying the warning contents display image when the determination step determines to issue a warning.

11. The control method for an image capture apparatus according to claim 9, wherein when the determination step determines not to issue a warning, the control step includes a step of causing a recording unit to record the image data.

12. The control method for an image capture apparatus according to claim 9, wherein when detecting an instruction from the user after the warning is issued by the informing step, the control step includes a step of causing the image capture unit to capture image data.

13. The control method for an image capture apparatus according to claim 9, wherein determination by the determination step is performed based on an in-focus state of the subject area.

14. The control method for an image capture apparatus according to claim 9, wherein determination by the determination step is performed based on hues of eyes of the subject.

15. The control method for an image capture apparatus according to claim 9, wherein determination by the determination step is performed based on eye opening of the subject.

16. The control method for an image capture apparatus according to claim 9, wherein when, as a result of determination by the determination step, causing the image capture unit to re-capture image data, the control step includes a step of setting a new control parameter of the image capture unit if a predetermined period of time or more has passed from last capturing.

* * * * *